(12) United States Patent
Yang et al.

(10) Patent No.: US 11,799,715 B2
(45) Date of Patent: Oct. 24, 2023

(54) BEAM FAILURE RECOVERY METHOD, TERMINAL DEVICE, AND NETWORK SIDE DEVICE

(71) Applicant: VIVO MOBILE COMMUNICATION CO., LTD., Guangdong (CN)

(72) Inventors: Yu Yang, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 9 days.

(21) Appl. No.: 17/147,511

(22) Filed: Jan. 13, 2021

(65) Prior Publication Data

US 2021/0135927 A1 May 6, 2021

Related U.S. Application Data

(63) Continuation of application No. PCT/CN2019/095020, filed on Jul. 8, 2019.

(30) Foreign Application Priority Data

Jul. 18, 2018 (CN) .......................... 201810789689.9

(51) Int. Cl.
*H04L 12/24* (2006.01)
*H04L 5/00* (2006.01)
(Continued)

(52) U.S. Cl.
CPC ........ *H04L 41/0654* (2013.01); *H04L 5/0048* (2013.01); *H04L 41/0896* (2013.01)

(58) Field of Classification Search
CPC .......... H04W 72/0493; H04W 72/1257; H04B 7/0695; H04B 7/088; H04B 7/0617
See application file for complete search history.

(56) References Cited

U.S. PATENT DOCUMENTS

2016/0323029 A1 11/2016 Cheng et al.
2018/0115990 A1 4/2018 Abedini et al.
(Continued)

FOREIGN PATENT DOCUMENTS

CN 107079459 A 8/2017
CN 107342801 A 11/2017
(Continued)

OTHER PUBLICATIONS

3rd Generation Partnership Project; V15.0.1; 2018; 39 pages.
(Continued)

*Primary Examiner* — Romani Ohri
(74) *Attorney, Agent, or Firm* — BROOKS KUSHMAN P.C.

(57) ABSTRACT

A beam failure recovery method, a terminal device, and a network side device are provided. The method includes: receiving higher layer signaling, where the higher layer signaling includes configuration information of a control resource set for beam failure recovery CORESET-BFR configured for the terminal device. The configuration information of the CORESET-BFR includes at least one of the following: a cell index of a cell on which the CORESET-BFR is located and a BWP index of a bandwidth part BWP on which the CORESET-BFR is located.

17 Claims, 3 Drawing Sheets

(51) Int. Cl.
*H04L 41/0654* (2022.01)
*H04L 41/0896* (2022.01)

(56) References Cited

U.S. PATENT DOCUMENTS

| | | | |
|---|---|---|---|
| 2018/0138962 A1 | 5/2018 | Islam et al. | |
| 2018/0219604 A1 | 8/2018 | Lu et al. | |
| 2020/0358582 A1* | 11/2020 | Takeda | H04B 7/0695 |
| 2021/0058130 A1* | 2/2021 | Zhu | H04W 74/0833 |
| 2021/0058133 A1* | 2/2021 | Takeda | H04W 72/042 |
| 2021/0099216 A1* | 4/2021 | Takeda | H04B 7/088 |
| 2021/0204231 A1* | 7/2021 | Harada | H04L 5/0053 |
| 2021/0234752 A1* | 7/2021 | Matsumura | H04B 7/0695 |
| 2021/0258809 A1* | 8/2021 | Gao | H04L 5/0051 |
| 2021/0259004 A1* | 8/2021 | Takeda | H04L 1/1896 |
| 2021/0321462 A1* | 10/2021 | Takahashi | H04W 74/02 |

FOREIGN PATENT DOCUMENTS

| | | |
|---|---|---|
| CN | 107534888 A | 8/2020 |
| WO | 2017/024516 A1 | 2/2017 |
| WO | 2018129300 A1 | 7/2018 |

OTHER PUBLICATIONS

Busan, Remaining Issues on Mechanism to recover from beam failure, May 21-25, 2018, pp. 2, Korea.

Huawei, Reply LS on beam failure recovery, May 21-25, 2018, 2 pages.

ISR and Written Opinion received for PCT Application No. PCT/CN2019/095020, dated Jan. 28, 2021, 9 pages and 6 pages of English Translation.

Leftover issues for BFR; Apr. 16-20, 2018; 5 pages.

Office Action Received for CN Patent Application No. 201810789689.9 dated May 20, 2021, 8 pages and 11 pages of English Translation.

Office Action Received for CN Patent Application No. 2018110789689. 9, dated Mar. 3, 2021, 8 pages and 10 pages of English Translation.

First Office Action for Korean Application No. 10-2021-7003951, dated Nov. 28, 2022, 9 Pages.

Samsung, "Corrections on Search Space Design," 3GPP TSG RAN WG1 Meeting #93, Agenda item 7.1.3.1.2, May 21-25, 2018, R1-1806729, Busan, Korea, 4 Pages.

Qualcomm Incorporated, "Beam Management for NR," 3GPP TSG-RAN WG1 Meeting 93, Agenda item 7.1.2.2.3, May 21-25, 2018, R1-1807341, Busan, Korea, 11 Pages.

Huawei et al: "Issues on BPWP switch and search space configuration for BFR", 3GPP Draft; R2-1810641 Issues on BWP Switch and Search Space Configuration for BFR, 3rd Generation Partnership Project(3GPP), Mobile Competence Centre ; 650, Route Des Lucioles ; F-06921 Sophia-Antip, vol. RAN WG2, No. Montreal, Canada; Jul. 2, 2018-Jul. 6, 2018 Jul. 1, 2018 (Jul. 1, 2018), XP051467784.

Mediatek Inc: "Summary 1 on Remaing 1-15 Issues on Beam Failure Recovery", 3GPP Draft; R1-1807661 Summary BFR V03, 3rd Generation Partnership Project—(3GPP), Mobile Competence Centre ; 650, Route Des Lucioles ; F-06921 Sophia-Antipolis Cedex; France, vol. RAN WGI, No. Busan, Korea; May 21, 2018-May 25, 2018 May 24, 2018 (May 24, 2018), XP051463292, Retrieved from the Internet: URL:http://www.3gpp.org/ftp/tsg%5Fran/WG1%5FRL1/TSGR1%5F93/Docs [retrieved on May 24, 2018].

Oppo: "Corrections for beam failure recovery configuration", 3GPP Draft; 38331 CR0126 R2-1810016 Corrections for Beam Failure-Receovery Configuration, 3rd Generation Partnership Project (3GPP), Mobile Competence Centre ; 650, Route Des Lucioles ; F-06921 Sophia, vol. RAN WG2, No. Montreal, Canada; Jul. 2, 2018-Jul. 6, 2018 Jul. 1, 2018 (Jul. 1, 2018), XP051466664, Retrieved from the Internet: URL:http://www.3gpp.org/ftp/Meetings%5F3GPP%5FSYNC/RAN2/Docs [retrieved on Jul. 1, 2018].

Supplementary European Search Report, dated Jul. 27, 2021 issued in EP19837923.

Vivo: "Remaining issues on mechanism to 1-15 recover from beam", 3GPP Draft; R1-1803818 Remaining Issues on Mechanism to Recover From Beam Failure, 3rd Generation Partnership Project (3GPP), Mobile Competence Centre ; 650, Route Des Lucioles ; F-06921 Sophia-Antipo, vol. RAN WG, No. Sanya, China; Apr. 16, 2018-Apr. 20, 2018 Apr. 15, 2018 (Apr. 15, 2018)), XP051426113, Retrieved from the Internet: URL:http://www.3gpp.org/ftp/Meetings%5F3GPP%5FSYNC/RAN1/Docs/ [retrieved on Apr. 15, 2018].

* cited by examiner

FIG. 1

Receive higher layer signaling, where the higher layer signaling includes configuration information of a CORESET-BFR configured for a terminal device, and the configuration information of the CORESET-BFR includes at least one of the following: a cell index of a cell on which the CORESET-BFR is located and a BWP index of a BWP on which the CORESET-BFR is located — S210

FIG. 2

Send higher layer signaling, where the higher layer signaling includes configuration information of a CORESET-BFR configured for a terminal device, and the configuration information of the CORESET-BFR includes at least one of the following: a cell index of a cell on which the CORESET-BFR is located and a BWP index of a BWP on which the CORESET-BFR is located — S310

BEAM FAILURE RECOVERY METHOD, TERMINAL DEVICE, AND NETWORK SIDE DEVICE

CROSS-REFERENCE TO RELATED APPLICATIONS

This application is a continuation application of International Application No. PCT/CN2019/095020 filed on Jul. 8, 2019, which claims priority to Chinese Patent Application No. 201810789689.9 filed in China on Jul. 18, 2018, which is incorporated herein by reference in its entirety.

TECHNICAL FIELD

The present disclosure relates to the communications field, and in particular, to a beam failure recovery method, a terminal device, and a network side device.

BACKGROUND

A large-scale antenna technology is introduced into New Radio (New Radio, NR) of a fifth-generation (5G) mobile communications system, to better support a multi-user multiple-input multiple-output (Multi-User Multiple-Input Multiple-Output, MU-MIMO) antenna technology. To reduce device costs and baseband processing complexity caused by a large-scale antenna array, a digital-analog hybrid beamforming technology is used to achieve a relatively coarse match between a transmit signal and a channel.

However, in a multi-carrier system based on the digital-analog hybrid beamforming technology, the related technology still lacks a solution to flexibly configure a control resource set for beam failure recovery (Control Resource Set Beam Failure Recovery, CORESET-BFR).

SUMMARY

An objective of embodiments of the present disclosure is to provide a beam failure recovery method, a terminal device, and a network side device, to resolve a problem that a CORESET-BFR cannot be flexibly configured in a multi-carrier system.

According to a first aspect, an embodiment of the present disclosure provides a beam failure recovery method, applied to a terminal device, where the method includes:

receiving higher layer signaling, where the higher layer signaling includes configuration information of a CORESET-BFR configured for the terminal device, where the configuration information of the CORESET-BFR includes at least one of the following:

a cell index of a cell on which the CORESET-BFR is located and a BWP index of a BWP on which the CORESET-BFR is located.

According to a second aspect, an embodiment of the present disclosure further provides a beam failure recovery method, applied to a network side device, where the method includes:

sending higher layer signaling, where the higher layer signaling includes configuration information of a CORESET-BFR configured for a terminal device, where the configuration information of the CORESET-BFR includes at least one of the following:

a cell index of a cell on which the CORESET-BFR is located and a BWP index of a BWP on which the CORESET-BFR is located.

According to a third aspect, an embodiment of the present disclosure further provides a terminal device, including:

a receiving module, configured to receive higher layer signaling, where the higher layer signaling includes configuration information of a CORESET-BFR configured for the terminal device, where the configuration information of the CORESET-BFR includes at least one of the following:

a cell index of a cell on which the CORESET-BFR is located and a BWP index of a BWP on which the CORESET-BFR is located.

According to a fourth aspect, an embodiment of the present disclosure further provides a terminal device, where the terminal device includes a processor, a memory, and a computer program that is stored in the memory and that can run on the processor, where when the computer program is executed by the processor, the steps in the beam failure recovery method according to first aspect are implemented.

According to a fifth aspect, an embodiment of the present disclosure further provides a computer-readable storage medium, where the computer-readable storage medium stores a computer program, and when the computer program is executed by a processor, the steps of the beam failure recovery method according to the first aspect are implemented.

According to a sixth aspect, an embodiment of the present disclosure further provides a network side device, including:

a sending module, configured to send higher layer signaling, where the higher layer signaling includes configuration information of a CORESET-BFR configured for a terminal device, where the configuration information of the CORESET-BFR includes at least one of the following:

a cell index of a cell on which the CORESET-BFR is located and a BWP index of a BWP on which the CORESET-BFR is located.

According to a seventh aspect, an embodiment of the present disclosure further provides a terminal device, where the terminal device includes a processor, a memory, and a computer program that is stored in the memory and that can run on the processor, where when the computer program is executed by the processor, the steps in the beam failure recovery method according to the second aspect are implemented.

According to an eighth aspect, an embodiment of the present disclosure further provides a computer-readable storage medium, where the computer-readable storage medium stores a computer program, and when the computer program is executed by a processor, the steps in the beam failure recovery method according to the second aspect are implemented.

In the embodiments of the present disclosure, the cell index of the cell on which the CORESET-BFR is located and/or the BWP index of the BWP on which the CORESET-BFR is located are added to the configuration information of the CORESET-BFR, so that a CORESET-BFR can be effectively and flexibly configured by using higher layer signaling in a multi-carrier system.

BRIEF DESCRIPTION OF DRAWINGS

The accompanying drawings illustrated herein are intended to provide a further understanding of the present disclosure and form a part of the present disclosure. The illustrative embodiments of the present disclosure and descriptions thereof are used to explain the present disclosure and do not constitute an improper limitation of the present disclosure. In the accompanying drawings.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure. A person skilled in the art can understand that "and/or" represents at least one of connected objects.

Figure 1:
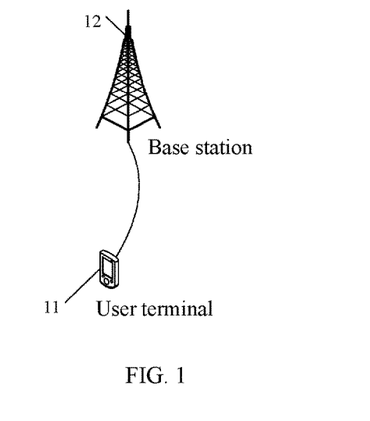
FIG. 1 is a schematic diagram of a network architecture according to an embodiment of the present disclosure.

FIG. 1 is a schematic diagram of a network architecture according to an embodiment of the present disclosure. As shown in FIG. 1, a user terminal 11 and a base station 12 are included. The user terminal 11 may be a terminal device (User Equipment, UE), for example, may be a terminal side device such as a mobile phone, a tablet computer (Tablet Personal Computer), a laptop computer (Laptop Computer), a personal digital assistant (personal digital assistant, PDA), a mobile Internet device (Mobile Internet Device, MID), or a wearable device (Wearable Device). It should be noted that a specific type of the user terminal 11 is not limited in this embodiment of the present disclosure. The base station 12 may be a 5G base station or a base station of a later release (for example, a gNB or a 5G NR NB), or a base station in another communications system, or referred to as a NodeB. It should be noted that in this embodiment of the present disclosure, the 5G base station is merely used as an example, and a specific type of the base station 12 is not limited.

It should be noted that, specific functions of the user terminal 11 and the base station 12 are to be specifically described by using the following plurality of embodiments.

Figure 2:
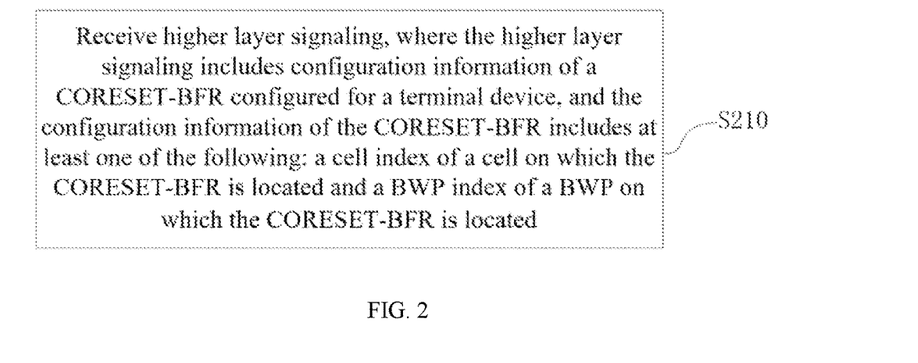
FIG. 2 is a schematic flowchart of a beam failure recovery method according to an embodiment of the present disclosure.

FIG. 2 is a schematic flowchart of a beam failure recovery method according to an embodiment of the present disclosure. The method is applied to a terminal device. The method may be shown as follows.

Step 210: Receive higher layer signaling, where the higher layer signaling includes configuration information of a CORESET-BFR configured for the terminal device, where the configuration information of the CORESET-BFR includes at least one of the following: a cell index of a cell on which the CORESET-BFR is located and a BWP index of a bandwidth part (Bandwidth Part, BWP) on which the CORESET-BFR is located.

The higher layer signaling includes at least one of the following: radio resource control (Radio Resource Control, RRC) signaling and medium access control control element (Medium Access Control Control Element, MAC CE) signaling.

A network side device adds the cell index of the cell on which the CORESET-BFR is located and/or the BWP index of the BWP on which the CORESET-BFR is located to the configuration information of the CORESET-BFR configured for the terminal device, and then sends the configuration information of the CORESET-BFR to the terminal device by using the higher layer signaling, thereby flexibly configuring the CORESET-BFR for the terminal device.

A cell in which the terminal device is currently located or a BWP on which the terminal device currently works may be the same as or may be different from the cell or the BWP on which the CORESET-BFR configured by the network side device for the terminal device is located. This is not specifically limited herein.

In an embodiment, the cell in which the terminal device is currently located is a first cell, and the network side device configures the configuration information of the CORESET-BFR for the terminal device in the first cell by using the higher layer signaling. The configuration information of the CORESET-BFR includes the cell index of the cell on which the CORESET-BFR is located, and the cell index indicates that the cell on which the CORESET-BFR is located is a second cell.

In another embodiment, the BWP on which the terminal device currently works is a first BWP, and the network side device configures the configuration information of the CORESET-BFR for the terminal device in the first BWP by using the higher layer signaling. The configuration information of the CORESET-BFR includes the BWP index of the BWP on which the CORESET-BFR is located, and the BWP index indicates that the BWP on which the CORESET-BFR is located is a second BWP.

In this embodiment of the present disclosure, the method further includes:

sending a beam failure recovery request (Beam Failure Recovery Request, BFRQ) in a case that the terminal device determines that a beam failure event (Beam Failure Event) occurs in the first cell or the first BWP;

switching to the second cell corresponding to the cell index or the second BWP corresponding to the BWP index, where the first cell and the second cell are different cells, and the first BWP and the second BWP are different BWPs;

determining quasi-colocation (Quasi-colocation, QCL) information of the CORESET-BFR; and receiving beam failure recovery request response information (Response) based on the QCL information of the CORESET-BFR on the second cell or the second BWP.

During actual application, in addition to configuring the CORESET-BFR for the terminal device, the network side device configures a beam failure detection reference signal (Beam Failure Detection Reference Signal, BFD RS) for the terminal device, so that the terminal device performs beam failure detection based on the BFD RS.

The terminal device measures the BFD RS at a physical layer, and determines, based on a measurement result, whether a beam failure event occurs. The terminal device sends a BFRQ to the network side device in a case that the terminal device determines, based on the measurement result, that a beam failure event occurs in the first cell in which the terminal device is located or the first BWP on which the terminal device works.

The terminal device may send the BFRQ to the network side device in at least two of the following manners.

In a first manner:

In this embodiment of the present disclosure, the sending a BFRQ in a case that the terminal device determines that a beam failure event occurs in the first cell or the first BWP includes:

determining a target beam reference signal for beam failure recovery; and sending the BFRQ by using a target channel resource corresponding to the target beam reference signal.

During actual application, in addition to configuring the CORESET-BFR and the BFD RS for the terminal device, the network side device configures candidate beam reference signals (Candidate Beam Reference Signal) for the terminal device. After determining that a beam failure event occurs, the terminal device may select a signal from the candidate beam reference signals as the target beam reference signal for beam failure recovery.

The candidate beam reference signal may be channel state information reference signals (Channel State information Reference Signal, CSI-RS), or may be synchronization signal blocks (Synchronization Signal Block, SSB), or may be other reference signals. This is not specifically limited herein.

The network side device configures corresponding target channel resources for the candidate beam reference signals.

The terminal device determines that a beam failure event occurs in the first cell or the first BWP, measures the candidate beam reference signals at a physical layer, determines the target beam reference signal for beam failure recovery from the candidate beam reference signals based on a measurement result, and then sends the BFRQ to the network side device by using the target channel resource corresponding to the target beam reference signal.

In a second manner:

In this embodiment of the present disclosure, the sending a BFRQ in a case that the terminal device determines that a beam failure event occurs in the first cell or the first BWP includes:

determining a target beam reference signal for beam failure recovery; and sending the BFRQ by using a preconfigured target channel resource, where the BFRQ includes identification information of the target beam reference signal. The network side device preconfigures, for the terminal device, a target channel resource for sending the BFRQ.

The terminal device determines that a beam failure event occurs in the first cell or the first BWP, measures candidate beam reference signals at a physical layer, determines the target beam reference signal for beam failure recovery from the candidate beam reference signals based on a measurement result, and then sends the BFRQ to the network side device by using the preconfigured target channel resource. The BFRQ carries identification information of the target beam reference signal.

In this embodiment of the present disclosure, the target channel resource is a semi-persistent physical uplink shared channel (Physical Uplink Shared Channel, PUSCH).

For example, the terminal device sends the BFRQ to the network side device by using a semi-persistent PUSCH corresponding to the target beam reference signal; or the terminal device sends the BFRQ to the network side device by using a preconfigured semi-persistent PUSCH, where the BFRQ includes identification information of the target beam reference signal.

In an embodiment of the present disclosure, the target channel resource includes at least two of the following: a semi-persistent PUSCH, a physical random access channel (Physical Random Access Channel, PRACH), and a physical uplink control channel (Physical Uplink Control Channel, PUCCH). The BFRQ may be sent in at least one of the following manners.

a. The BFRQ is to be sent by using a target channel resource with a sending priority satisfying a first preset condition in the at least two target channel resources.

A sending priority of each channel resource in the at least two target channel resources may be preconfigured by the network side device, or may be pre-agreed upon by the network side device and the terminal device.

The first preset condition may be determined according to an actual situation, and is not specifically limited herein.

Optionally, the first preset condition is that a sending priority is the highest.

For example, there are three target channel resources: a semi-persistent PUSCH, a PRACH, and a PUCCH. The three target channel resources sorted in descending order of sending priorities are sequentially: the semi-persistent PUSCH, the PUCCH, and the PRACH. In this case, the terminal device sends the BFRQ to the network side device by using the target channel resource (the semi-persistent PUSCH) with the highest sending priority.

b. The BFRQ is to be sent by using a target channel resource with a sending moment satisfying a second preset condition in the at least two target channel resources.

Each of the at least two target channel resources has a corresponding sending moment (periodic or aperiodic). The terminal device sends the BFRQ to the network side device by using a target channel resource with a sending moment satisfying a second preset condition in the at least two target channel resources.

The second preset condition may be determined according to an actual situation, and is not limited herein.

Optionally, the second preset condition is that a sending moment is closest to a current moment.

For example, there are three target channel resources: a semi-persistent PUSCH, a PRACH, and a PUCCH. The three target channel resources sorted in ascending order of differences between sending moments and the current moment are sequentially: the PUCCH, the PRACH, and the semi-persistent PUSCH. In this case, the terminal device sends the BFRQ to the network side device by using the target channel resource (the PUCCH) with a sending moment closest to the current moment.

c. The BFRQ is to be sent by using a target channel resource with a payload size satisfying a third preset condition in the at least two target channel resources.

The third preset condition may be determined according to an actual situation, and is not limited herein.

Optionally, the third preset condition is that a payload size is greater than a size of the BFRQ.

For example, there are three types of target channel resources: a semi-persistent PUSCH, a PRACH, and a PUCCH. In the three target channel resources, the PRACH has a payload size greater than the size of the BFRQ. In this case, the terminal device sends the BFRQ to the network side device by using the PRACH.

d. The BFRQ is to be sent by using each of the at least two target channel resources.

For example, there are three target channel resources: a semi-persistent PUSCH, a PRACH, and a PUCCH. The terminal device sends the BFRQ to the network side device by using the semi-persistent PUSCH, the PRACH, and the PUCCH, respectively.

A sending moment of each target channel resource for sending the BFRQ may be the same or may be different. This is not specifically limited herein.

The foregoing four manners a to d may be used individually, or a plurality of manners may be jointly used. This is not specifically limited herein.

For example, there are three target channel resources: a semi-persistent PUSCH, a PRACH, and a PUCCH. The terminal device sends the BFRQ by jointly using the foregoing manners c and a:

First, the terminal device selects a target channel resource with a payload size satisfying the third preset condition (the payload size being greater than the size of the BFRQ) in the three target channel resources. In this case, there are two target channel resources whose payload sizes are greater than the size of the BFRQ: the semi-persistent PUSCH and the PRACH.

Then, the terminal device sends the BFRQ to the network side device by using a target channel resource whose sending priority satisfies the first preset condition (the sending priority being the highest) and that is selected from the semi-persistent PUSCH and the PRACH. That is, the terminal device sends the BFRQ to the network side device by using the semi-persistent PUSCH with a relatively higher sending priority.

In this embodiment of the present disclosure, the configuration information of the CORESET-BFR further includes a transmission configuration indication state (Transmission Configuration Indication state, TCI state) of the CORESET-BFR.

The network side device may configure the TCI state of the CORESET-BFR in at least two of the following manners.

In a first manner:

The network side device configures one TCI state for the CORESET-BFR by using RRC signaling.

When the network side device configures the configuration information of the CORESET-BFR for the terminal device by using the RRC signaling, the configuration information of the CORESET-BFR includes one TCI state, that is, the TCI state is the TCI state of the CORESET-BFR.

In a second manner:

The network side device configures a plurality of TCI states by using RRC signaling, to indicate one of the plurality of TCI states as the TCI state of the CORESET-BFR to the terminal device by using MAC CE signaling.

When the network side device configures the configuration information of the CORESET-BFR for the terminal device by using the RRC signaling, the configuration information of the CORESET-BFR includes a plurality of TCI states. Then, the network side device indicates one of the plurality of TCI states as the TCI state of the CORESET-BFR to the terminal device by using the MAC CE signaling.

In a case that the first cell that is of the terminal device and in which a beam failure event occurs is a cell different from the second cell indicated by the cell index in the configuration information of the CORESET-BFR, or the first BWP that is of the terminal device and in which a beam failure event occurs is a BWP different from the second BWP indicated by the BWP index in the configuration information of the CORESET-BFR, after sending the BFRQ to the network side device, the terminal device needs to switch to the second cell or the second BWP within preset duration (four slots slots), and determines the QCL information of the CORESET-BFR, so that the beam failure recovery request response information can be received in the second cell or the second BWP based on the QCL information of the CORESET-BFR.

The terminal device may determine the QCL information of the CORESET-BFR in at least two of the following manners. In a first manner:

In this embodiment of the present disclosure, the determining the QCL information of the CORESET-BFR includes:

determining the QCL information of the CORESET-BFR based on the TCI state of the CORESET-BFR.

In a case that the configuration information of the CORESET-BFR includes the TCI state of the CORESET-BFR, because the TCI state of the CORESET-BFR is used to indicate the QCL information of the CORESET-BFR, the terminal device determines the QCL information of the CORESET-BFR based on the TCI state of the CORESET-BFR.

For example, a source reference signal (Source Reference Signal, Source RS) indicated by the TCI state of the CORESET-BFR is a CSI-RS resource. In this case, the terminal device may determine that the CSI-RS resource and the CORESET-BFR are QCL.

The QCL information of the CORESET-BFR is determined based on the TCI state of the CORESET-BFR configured by the network side device for the terminal device, so that the network side device and the terminal device have a same understanding of the QCL information of the CORESET-BFR, thereby ensuring accuracy of the QCL information of the CORESET-BFR.

In a second manner:

In this embodiment of the present disclosure, the determining the QCL information of the CORESET-BFR includes:

determining QCL information of the target beam reference signal as the QCL information of the CORESET-BFR.

Regardless of whether the QCL information of the CORESET-BFR includes the TCI state of the CORESET-BFR, the terminal device determines the QCL information of the target beam reference signal as the QCL information of the CORESET-BFR.

For example, the target beam reference signal is an SSB resource. In this case, the terminal device may determine QCL information of the SSB resource as the QCL information of the CORESET-BFR. That is, the SSB resource and the CORESET-BFR are QCL.

In this embodiment of the present disclosure, the receiving beam failure recovery request response information based on the QCL information of the CORESET-BFR on the second cell or the second BWP includes:

receiving, within a target time window based on the QCL information of the CORESET-BFR on the second cell or the second BWP, the beam failure recovery request response information carried on a dedicated physical downlink control channel (Physical Downlink Control Channel, PDCCH) in the CORESET-BFR.

After switching to the second cell or the second BWP on which the CORESET-BFR is located, the terminal device performs monitoring within the target time window, and receives the beam failure recovery request response information that is sent by the network side device on the dedicated PDCCH of the CORESET-BFR.

The beam failure recovery request response information may include signaling that explicitly or implicitly instructs the terminal device to switch to a target beam corresponding to the target beam reference signal, may include signaling that instructs the terminal device to restart beam search, or may include other signaling. This is not specifically limited herein.

In a case that the terminal device receives the beam failure recovery request response information in a process of monitoring the target time window, the beam failure recovery succeeds.

In this embodiment of the present disclosure, the method further includes:

outside the target time window, switching to the first cell or the first BWP in which the beam failure event occurs; and monitoring a CORESET configured on the first cell, or monitoring a CORESET configured on the first BWP.

In a case that the terminal device does not receive the beam failure recovery request response information in a process of monitoring the target time window, the terminal device may switch, outside the target time window, to the first cell or the first BWP in which the beam failure event occurs to monitor a CORESET configured on the first cell or monitor a CORESET configured on the first BWP.

In a case that the terminal device can implement normal communication when monitoring the CORESET configured on the first cell or monitoring the CORESET configured on the first BWP, the terminal device does not need to perform any beam failure recovery operation, or still switches to the second cell or the second BWP before a next target time window arrives and performs monitoring within the target time window. In a case that the terminal device still cannot implement normal communication when monitoring the CORESET configured on the first cell or monitoring the CORESET configured on the first BWP, the terminal device switches to the second cell or the second BWP before a next target time window arrives and performs monitoring within the target time window.

In the technical solutions recorded in this embodiment of the present disclosure, the cell index of the cell on which the CORESET-BFR is located and/or the BWP index of the BWP on which the CORESET-BFR is located are added to the configuration information of the CORESET-BFR, so that a CORESET-BFR can be effectively and flexibly configured by using higher layer signaling in a multi-carrier system.

Figure 3:
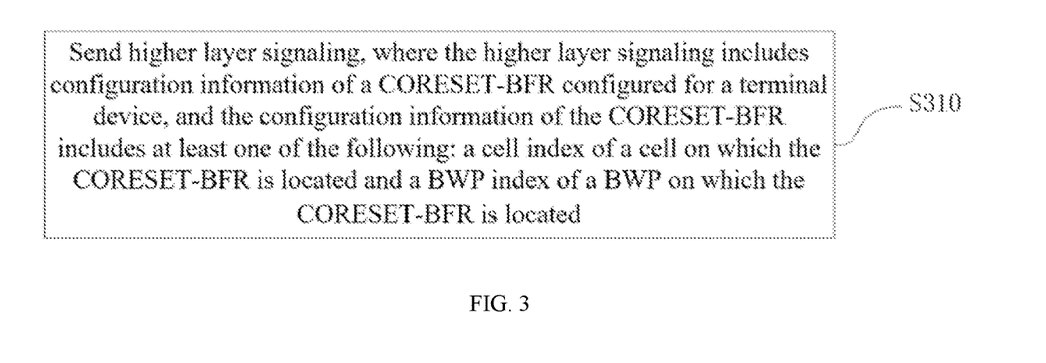
FIG. 3 is another schematic flowchart of a beam failure recovery method according to an embodiment of the present disclosure.

FIG. 3 is a schematic flowchart of a beam failure recovery method according to an embodiment of the present disclosure. The method is applied to a network side device. The method may be shown as follows.

Step 310: Send higher layer signaling, where the higher layer signaling includes configuration information of a CORESET-BFR configured for a terminal device, where the configuration information of the CORESET-BFR includes at least one of the following: a cell index of a cell on which the CORESET-BFR is located and a BWP index of a BWP on which the CORESET-BFR is located.

The higher layer signaling includes at least one of the following: RRC signaling and MAC CE signaling.

The network side device adds the cell index of the cell on which the CORESET-BFR is located and/or the BWP index of the BWP on which the CORESET-BFR is located to the configuration information of the CORESET-BFR configured for the terminal device, and then sends the configuration information of the CORESET-BFR to the terminal device by using the higher layer signaling, thereby flexibly configuring the CORESET-BFR for the terminal device.

A cell in which the terminal device is currently located or a BWP on which the terminal device currently works may be the same as or may be different from the cell or the BWP on which the CORESET-BFR configured by the network side device for the terminal device is located. This is not specifically limited herein.

In this embodiment of the present disclosure, the method further includes:

receiving a BFRQ sent by the terminal device;

determining QCL information of the CORESET-BFR; and sending beam failure recovery request response information based on the QCL information of the CORESET-BFR in a second cell corresponding to the cell index or a second BWP corresponding to the BWP index.

During actual application, in addition to configuring the CORESET-BFR for the terminal device, the network side device configures a BFD RS for the terminal device, so that the terminal device performs beam failure detection based on the BFD RS.

The terminal device measures the BFD RS at a physical layer, and determines, based on a measurement result, whether a beam failure event occurs. The terminal device sends a BFRQ to the network side device in a case that the terminal device determines, based on the measurement result, that a beam failure event occurs in the first cell in which the terminal device is located or the first BWP on which the terminal device works, so that the network side device can receive the BFRQ sent by the terminal device.

The network side device may receive, in at least two of the following manners, the BFRQ sent by the terminal device.

In a first manner:

In this embodiment of the present disclosure, the receiving a BFRQ sent by the terminal device includes:

receiving the BFRQ by using a target channel resource, where the target channel resource is a channel resource corresponding to a target beam reference signal.

During actual application, in addition to configuring the CORESET-BFR and the BFD RS for the terminal device, the network side device configures candidate beam reference signals for the terminal device. After determining that a beam failure event occurs, the terminal device may select a signal from the candidate beam reference signals as the target beam reference signal for beam failure recovery.

The candidate beam reference signals may be CSI-RSs, or may be SSBs, or may be other reference signals. This is not specifically limited herein.

The network side device configures corresponding target channel resources for the candidate beam reference signals.

The terminal device determines that a beam failure event occurs in the first cell or the first BWP, determines the target beam reference signal from the candidate beam reference signals, and then sends the BFRQ to the network side device by using the target channel resource corresponding to the target beam reference signal.

After the network side device receives the BFRQ on the target channel resource, because the target beam reference signal corresponds to the target channel resource, the network side device can determine the target beam reference signal selected by the terminal device.

In a second manner:

In this embodiment of the present disclosure, the receiving a BFRQ sent by the terminal device includes:

receiving the BFRQ by using a preconfigured target channel resource, where the BFRQ includes identification information of the target beam reference signal.

The network side device preconfigures, for the terminal device, a target channel resource for sending the BFRQ.

The terminal device determines that a beam failure event occurs in the first cell or the first BWP, determines the target beam reference signal from the candidate beam reference signals, and then sends the BFRQ to the network side device by using the preconfigured target channel resource. The BFRQ carries identification information of the target beam reference signal.

After receiving the BFRQ on the target channel resource, the network side device can determine, based on the identification information of the target beam reference signal that is carried in the BFRQ, the target beam reference signal selected by the terminal device.

In this embodiment of the present disclosure, the target channel resource is a semi-persistent PUSCH.

For example, the network side device receives, by using a semi-persistent PUSCH corresponding to the target beam reference signal, the BFRQ sent by the terminal device; or the network side device receives, by using a preconfigured semi-persistent PUSCH, the BFRQ sent by the terminal device. The BFRQ includes the identification information of the target beam reference signal.

In this embodiment of the present disclosure, the target channel resource includes at least two of the following: a semi-persistent PUSCH, a PRACH, and a PUCCH. The BFRQ may be received in at least one of the following manners.

a. The BFRQ is to be received by using a target channel resource with a receiving priority satisfying a first preset condition in the at least two target channel resources.

A receiving priority of each channel resource in the at least two target channel resources may be preconfigured by the network side device, or may be pre-agreed upon by the network side device and the terminal device.

The first preset condition may be determined according to an actual situation, and is not specifically limited herein.

Optionally, the first preset condition is that a receiving priority is the highest.

For example, there are three target channel resources: a semi-persistent PUSCH, a PRACH, and a PUCCH. The three target channel resources sorted in descending order of receiving priorities are sequentially: the semi-persistent PUSCH, the PUCCH, and the PRACH. In this case, the network side device receives, by using the target channel resource (the semi-persistent PUSCH) with the highest receiving priority, the BFRQ sent by the terminal device.

b. The BFRQ is to be received by using a target channel resource with a receiving moment satisfying a second preset condition in the at least two target channel resources.

Each of the at least two target channel resources has a corresponding receiving moment (periodic or aperiodic). The network side device receives, by using a target channel resource with a receiving moment satisfying a second preset condition in the at least two target channel resources, the BFRQ sent by the terminal device.

The second preset condition may be determined according to an actual situation, and is not limited herein.

Optionally, the second preset condition is that a receiving moment is closest to a current moment.

For example, there are three target channel resources: a semi-persistent PUSCH, a PRACH, and a PUCCH. The three target channel resources sorted in ascending order of differences between receiving moments and the current moment are sequentially: the PUCCH, the PRACH, and the semi-persistent PUSCH. In this case, the network side device receives, by using the target channel resource (PUCCH) within a receiving moment closes to the current moment, the BFRQ sent by the terminal device.

c. The BFRQ is to be received by using a target channel resource with a payload size satisfying a third preset condition in the at least two target channel resources.

The third preset condition may be determined according to an actual situation, and is not limited herein.

Optionally, the third preset condition is that a payload size is greater than a size of the BFRQ.

For example, there are three types of target channel resources: a semi-persistent PUSCH, a PRACH, and a PUCCH. In the three target channel resources, the PRACH has a payload size greater than the size of the BFRQ. The network side device receives, by using the PRACH, the BFRQ sent by the terminal device.

d. The BFRQ is to be received by using each of the at least two target channel resources. For example, there are three target channel resources: a semi-persistent PUSCH, a PRACH, and a PUCCH. The network side device receives, by using the semi-persistent PUSCH, the PRACH, and the PUCCH, respectively, the BFRQ sent by the terminal device.

A receiving moment of each target channel resource for receiving the BFRQ may be the same or may be different. This is not specifically limited herein.

The foregoing four manners a to d may be used individually, or a plurality of manners may be jointly used. This is not specifically limited herein.

For example, there are three target channel resources: a semi-persistent PUSCH, a PRACH, and a PUCCH. The network side device receives the BFRQ by jointly using the foregoing manners c and a:

First, the network side device selects a target channel resource with a payload size satisfying the third preset condition (the payload size being greater than the size of the BFRQ) in the three target channel resources. In this case, there are two target channel resources whose payload sizes are greater than the size of the BFRQ: the semi-persistent PUSCH and the PRACH.

Then, the network side device receives, by using a target channel resource whose receiving priority satisfies the first preset condition (the receiving priority being the highest) and that is selected from the semi-persistent PUSCH and the PRACH, the BFRQ sent by the terminal device. That is, the network side device receives, by using the semi-persistent PUSCH with a relatively higher receiving priority, the BFRQ sent by the terminal device.

In this embodiment of the present disclosure, the configuration information of the CORESET-BFR further includes a TCI state of the CORESET-BFR.

The network side device may configure the TCI state of the CORESET-BFR in at least two of the following manners.

In a first manner:

The network side device configures one TCI state for the CORESET-BFR by using RRC signaling.

When the network side device configures the configuration information of the CORESET-BFR for the terminal device by using the RRC signaling, the configuration information of the CORESET-BFR includes one TCI state, that is, the TCI state is the TCI state of the CORESET-BFR.

In a second manner:

The network side device configures a plurality of TCI states by using RRC signaling, to indicate one of the plurality of TCI states as the TCI state of the CORESET-BFR to the terminal device by using MAC CE signaling.

When the network side device configures the configuration information of the CORESET-BFR for the terminal device by using the RRC signaling, the configuration information of the CORESET-BFR includes a plurality of TCI states. Then, the network side device indicates one of the plurality of TCI states as the TCI state of the CORESET-BFR to the terminal device by using the MAC CE signaling.

In a case that the network side device receives the BFRQ sent by the terminal device, the network side device determines the QCL information of the CORESET-BFR configured for the terminal device, and then sends beam failure recovery request response information based on the QCL information of the CORESET-BFR in a second cell or a second BWP on which the CORESET-BFR is located.

The network side device may determine the QCL information of the CORESET-BFR in at least two of the following manners.

In a first manner:

In this embodiment of the present disclosure, the determining the QCL information of the CORESET-BFR includes:

determining the QCL information of the CORESET-BFR based on the TCI state of the CORESET-BFR. In a case that the configuration information of the CORESET-BFR configured by the network side device for the terminal device includes the TCI state of the CORESET-BFR, because the TCI state of the CORESET-BFR is used to indicate the QCL information of the CORESET-BFR, the network side device determines the QCL information of the CORESET-BFR based on the TCI state of the CORESET-BFR.

For example, in a case that a source RS indicated by the TCI state configured by the network side device for the CORESET-BFR is a CSI-RS resource, the network side device may determine that the CSI-RS resource and the CORESET-BFR are QCL.

The QCL information of the CORESET-BFR is determined based on the TCI state of the CORESET-BFR configured by the network side device for the terminal device, so that the network side device and the terminal device have a same understanding of the QCL information of the CORESET-BFR, thereby ensuring accuracy of the QCL information of the CORESET-BFR.

In a second manner:

In this embodiment of the present disclosure, the determining the QCL information of the CORESET-BFR includes:

determining QCL information of the target beam reference signal as the QCL information of the CORESET-BFR.

Regardless of whether the configuration information of the CORESET-BFR includes the TCI state of the CORESET-BFR, the network side device determines the QCL information of the target beam reference signal as the QCL information of the CORESET-BFR. The target beam reference signal is a candidate beam reference signal corresponding to a target channel resource for receiving the BFRQ, or the target beam reference signal is a candidate beam reference signal corresponding to identification information of a target beam reference signal that is included in a received BFRQ.

For example, the target beam reference signal is an SSB resource. In this case, the network side device may determine QCL information of the SSB resource as the QCL information of the CORESET-BFR. That is, the SSB resource and the CORESET-BFR are QCL.

In this embodiment of the present disclosure, the sending beam failure recovery request response information based on the QCL information of the CORESET-BFR in a second cell corresponding to the cell index or a second BWP corresponding to the BWP index includes:

sending, within a target time window based on the QCL information of the CORESET-BFR on the second cell or the second BWP, the beam failure recovery request response information by using a dedicated PDCCH in the CORESET-BFR.

The network side device receives the BFRQ sent by the terminal device, and determines the CORESET-BFR configured for the terminal device and the QCL information of the CORESET-BFR. Subsequently, the network side device sends, within a time window in the second cell or the second BWP on which the CORESET-BFR is located, the beam failure recovery request response information by using the dedicated PDCCH in the CORESET-BFR.

The beam failure recovery request response information may include signaling that explicitly or implicitly instructs the terminal device to switch to a target beam corresponding to the target beam reference signal, may include signaling that instructs the terminal device to restart beam search, or may include other signaling. This is not specifically limited herein.

In the technical solutions recorded in this embodiment of the present disclosure, the cell index of the cell on which the CORESET-BFR is located and/or the BWP index of the BWP on which the CORESET-BFR is located are added to the configuration information of the CORESET-BFR, so that a CORESET-BFR can be effectively and flexibly configured by using higher layer signaling in a multi-carrier system.

Figure 4:
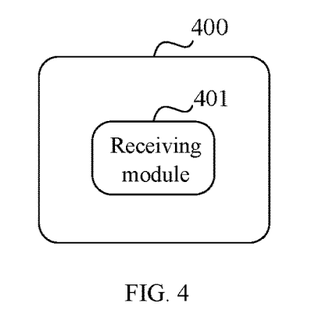
FIG. 4 is a schematic structural diagram of a terminal device according to an embodiment of the present disclosure.

FIG. 4 is a schematic structural diagram of a terminal device according to an embodiment of the present disclosure. The terminal device 400 shown in FIG. 4 includes:

a receiving module 401, configured to receive higher layer signaling, where the higher layer signaling includes configuration information of a CORESET-BFR configured for the terminal device 400, where the configuration information of the CORESET-BFR includes at least one of the following:

a cell index of a cell on which the CORESET-BFR is located and a BWP index of a BWP on which the CORESET-BFR is located.

Optionally, the terminal device 400 further includes:

a sending module, configured to send a BFRQ in a case that the terminal device 400 determines that a beam failure event occurs in a first cell or a first BWP;

a switching module, configured to switch to a second cell corresponding to the cell index or a second BWP corresponding to the BWP index, where the first cell and the second cell are different cells, and the first BWP and the second BWP are different BWPs; and a determining module, configured to determine QCL information of the CORESET-BFR, where the receiving module 401 is further configured to receive beam failure recovery request response information based on the QCL information of the CORESET-BFR on the second cell or the second BWP.

Optionally, the sending module is further configured to:

determine a target beam reference signal for beam failure recovery; and send the BFRQ by using a target channel resource corresponding to the target beam reference signal.

Optionally, the sending module is further configured to:

determine a target beam reference signal for beam failure recovery; and send the BFRQ by using a preconfigured target channel resource, where the BFRQ includes identification information of the target beam reference signal.

Optionally, the target channel resource is a semi-persistent PUSCH.

Optionally, the target channel resource includes at least two of the following: a semi-persistent PUSCH, a PRACH, and a PUCCH. The sending module is further configured to:

send the BFRQ by using a target channel resource with a sending priority satisfying a first preset condition in the at least two target channel resources;

send the BFRQ by using a target channel resource with a sending moment satisfying a second preset condition in the at least two target channel resources;

send the BFRQ by using a target channel resource with a payload size satisfying a third preset condition in the at least two target channel resources; and send the BFRQ by using each of the at least two target channel resources.

Optionally, the configuration information of the CORESET-BFR further includes a TCI state of the CORESET-BFR.

Optionally, the determining module is further configured to:

determine the QCL information of the CORESET-BFR based on the TCI state of the CORESET-BFR.

Optionally, the determining module is further configured to:

determine QCL information of the target beam reference signal as the QCL information of the CORESET-BFR.

Optionally, the receiving module 401 is further configured to:

receive, within a target time window based on the QCL information of the CORESET-BFR on the second cell or the second BWP, the beam failure recovery request response information carried on a dedicated PDCCH in the CORESET-BFR.

Optionally, the terminal device 400 further includes:

the switching module, further configured to: outside the target time window, switch to the first cell or the first BWP in which the beam failure event occurs; and a monitoring module, configured to monitor a CORESET configured on the first cell, or monitor a CORESET configured on the first BWP.

Optionally, the higher layer signaling includes at least one of the following:

RRC signaling and MAC CE signaling.

The terminal device 400 provided in this embodiment of the present disclosure can implement the processes implemented by the terminal device in the method embodiment of FIG. 2. To avoid repetition, details are not described herein again.

Figure 5:
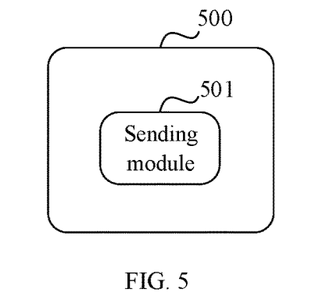
FIG. 5 is a schematic structural diagram of a network side device according to an embodiment of the present disclosure.

FIG. 5 is a schematic structural diagram of a network side device according to an embodiment of the present disclosure. The network side device 500 shown in FIG. 5 includes:

a sending module 501, configured to send higher layer signaling, where the higher layer signaling includes configuration information of a CORESET-BFR configured for a terminal device, where the configuration information of the CORESET-BFR includes at least one of the following:

a cell index of a cell on which the CORESET-BFR is located and a BWP index of a BWP on which the CORESET-BFR is located.

Optionally, the network side device 500 further includes:

a receiving module, configured to receive a BFRQ sent by the terminal device; and a determining module, configured to determine QCL information of the CORESET-BFR, where the sending module 501 is further configured to send beam failure recovery request response information based on the QCL information of the CORESET-BFR in a second cell corresponding to the cell index or a second BWP corresponding to the BWP index.

Optionally, the receiving module is further configured to:

receive the BFRQ by using a target channel resource, where the target channel resource is a channel resource corresponding to a target beam reference signal.

Optionally, the receiving module is further configured to:

receive the BFRQ by using a preconfigured target channel resource, where the BFRQ includes identification information of the target beam reference signal.

Optionally, the target channel resource is a semi-persistent PUSCH.

Optionally, the target channel resource includes at least two of the following: a semi-persistent PUSCH, a PRACH, and a PUCCH. The receiving module is further configured to:

receive the BFRQ by using a target channel resource with a receiving priority satisfying a first preset condition in the at least two target channel resources;

receive the BFRQ by using a target channel resource with a receiving moment satisfying a second preset condition in the at least two target channel resources;

receive the BFRQ by using a target channel resource with a payload size satisfying a third preset condition in the at least two target channel resources; and receive the BFRQ by using each of the at least two target channel resources.

Optionally, the configuration information of the CORESET-BFR further includes a TCI state of the CORESET-BFR.

Optionally, the determining module is further configured to:

determine the QCL information of the CORESET-BFR based on the TCI state of the CORESET-BFR.

Optionally, the determining module is further configured to:

determine QCL information of the target beam reference signal as the QCL information of the CORESET-BFR.

Optionally, the sending module 501 is further configured to:

send, within a target time window based on the QCL information of the CORESET-BFR on the second cell or the second BWP, the beam failure recovery request response information by using a dedicated PDCCH in the CORESET-BFR.

Optionally, the higher layer signaling includes at least one of the following:

RRC signaling and MAC CE signaling.

The network side device 500 provided in this embodiment of the present disclosure can implement the processes implemented by the network side device in the method embodiment of FIG. 3. To avoid repetition, details are not described herein again.

Figure 6:
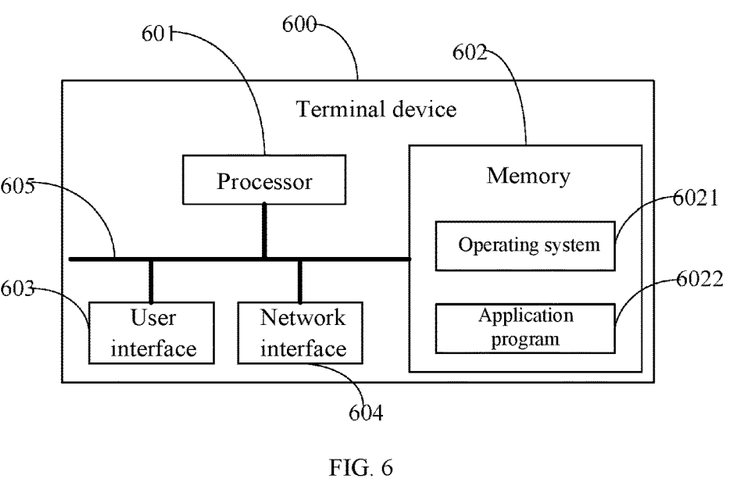
FIG. 6 is another schematic structural diagram of a terminal device according to an embodiment of the present disclosure.

FIG. 6 is another schematic structural diagram of a terminal device according to an embodiment of the present disclosure. The terminal device 600 shown in FIG. 6 includes at least one processor 601, a memory 602, at least one network interface 604, and a user interface 603. The components of the terminal device 600 are coupled together by using a bus system 605. It may be understood that the bus system 605 is configured to implement a connection and communication between these components. In addition to a data bus, the bus system 605 may include a power bus, a control bus, and a status signal bus. However, for clarity of description, various buses are marked as the bus system 605 in FIG. 6.

The user interface 603 may include a display, a keyboard, or a clicking device (such as a mouse, a trackball (trackball), a touch panel, or a touchscreen).

It may be understood that the memory 602 in this embodiment of the present disclosure may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. By way of exemplary but not restrictive description, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 602 in the system and the method that are described in this embodiment of the present disclosure is intended to include but is not limited to these memories and a memory of any other proper type.

In some implementations, the memory 602 stores the following element: an executable module or a data structure, a subset of an executable module or a data structure, or an extended set of an executable module or a data structure: an operating system 6021 and an application program 6022.

The operating system 6021 includes various system programs, for example, a framework layer, a kernel library layer, and a driver layer, and is configured to implement various basic services and process hardware-based tasks. The application program 6022 includes various application programs, for example, a media player (Media Player) and a browser (Browser), and is configured to implement various application services. A program for implementing the method in the embodiments of the present disclosure may be included in the application program 6022.

In this embodiment of this disclosure, the terminal device 600 further includes a computer program that is stored in the memory 602 and that can run on the processor 601. When the computer program is executed by the processor 601, the following steps are implemented:

receiving higher layer signaling, where the higher layer signaling includes configuration information of a CORESET-BFR configured for the terminal device, where the configuration information of the CORESET-BFR includes at least one of the following: a cell index of a cell on which the CORESET-BFR is located and a BWP index of a BWP on which the CORESET-BFR is located.

The method disclosed in the foregoing embodiments of the present disclosure may be applied to the processor 601, or may be implemented by the processor 601. The processor 601 may be an integrated circuit chip with a signal processing capability. During implementation, the steps of the foregoing method may be completed by a hardware integrated logic circuit in the processor 601 or instructions in a form of software. The processor 601 may be a general purpose processor, a digital signal processor (Digital Signal Processor, DSP), an application specific integrated circuit (Application Specific Integrated Circuit, ASIC), a field programmable gate array (Field Programmable Gate Array, FPGA), another programmable logic device, a discrete gate or transistor logic device, or a discrete hardware component. The methods, steps, and logical block diagrams in the embodiments of the present disclosure may be implemented or executed. The general purpose processor may be a microprocessor, or the processor may be any conventional processor, or the like. The steps of the method disclosed in the embodiments of the present disclosure may be directly embodied as being executed and completed by a hardware decoding processor, or executed and completed by a combination of hardware and software modules in a decoding processor. The software module may be located in a computer-readable storage medium that is mature in the art, such as a random access memory, a flash memory, a read-only memory, a programmable read-only memory, an electrically erasable programmable memory, or a register. The computer-readable storage medium is located in the memory 602. The processor 601 reads information in the memory 602, and performs the foregoing method steps in combination with hardware of the processor 601. Specifically, the computer-readable storage medium stores a computer program. When the computer program is executed by the processor 601, the steps in the method embodiment of FIG. 2 are implemented.

It can be understood that these embodiments described in the embodiments of the present disclosure may be implemented with hardware, software, firmware, middleware, microcode, or a combination thereof. For implementation with hardware, a processing unit can be implemented in one or more application-specific integrated circuits (Application Specific Integrated Circuits, ASIC), a digital signal processor (Digital Signal Processing, DSP), a digital signal processing device (DSP Device, DSPD), a programmable logic device (Programmable Logic Device, PLD), a field programmable gate array (Field-Programmable Gate Array, FPGA), a general purpose processor, a controller, a microcontroller, a microprocessor, another electronic unit for implementing the functions of the present disclosure, or a combination thereof.

For implementation with software, the technology described in the embodiments of the present disclosure may be implemented by executing modules (for example, processes and functions) for functions described in the embodiments of the present disclosure. Software code may be stored in the memory and executed by the processor. The memory can be implemented inside or outside the processor.

The terminal device 600 can implement the processes implemented by the terminal device in the method embodiment of FIG. 2. To avoid repetition, details are not described herein again.

An embodiment of the present disclosure further provides a computer-readable storage medium. The computer-readable storage medium stores a computer program. When the computer program is executed by a processor, the processes of the method embodiment of FIG. 2 are implemented, and a same technical effect can be achieved. To avoid repetition, details are not described herein again. The computer-readable storage medium is, for example, a read-only memory (Read-Only Memory, ROM), a random access memory (Random Access Memory, RAM), a magnetic disk, or an optical disc.

Figure 7:
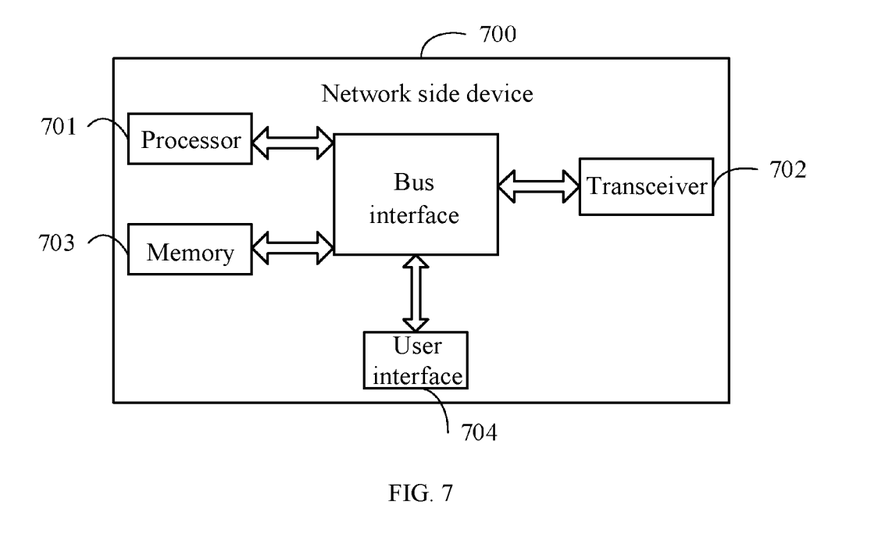
FIG. 7 is another schematic structural diagram of a network side device according to an embodiment of the present disclosure.

FIG. 7 is another schematic structural diagram of a network side device according to an embodiment of the present disclosure. The network side device 700 shown in FIG. 7 can implement the details of the method embodiment of FIG. 3, and a same effect can be achieved. As shown in FIG. 7, the network side device 700 includes a processor 701, a transceiver 702, a memory 703, a user interface 704, and a bus interface.

In this embodiment of the present disclosure, the network side device 700 further includes a computer program that is stored in the memory 703 and that can run on the processor 701. When the computer program is executed by the processor 701, the following steps are implemented:

sending higher layer signaling, where the higher layer signaling includes configuration information of a CORESET-BFR configured for a terminal device, where the configuration information of the CORESET-BFR includes at least one of the following: a cell index of a cell on which the CORESET-BFR is located and a BWP index of a BWP on which the CORESET-BFR is located.

In FIG. 7, a bus architecture may include any quantity of interconnected buses and bridges, which are specifically connected together by various circuits of one or more processors represented by the processor 701 and a memory represented by the memory 703. The bus architecture may further connect together various other circuits of a peripheral device, a voltage stabilizer, a power management circuit, and the like, which are known in the art and will not be further described herein. The bus interface provides an interface. The transceiver 702 may be a plurality of elements, that is, include a transmitter and a receiver, and provide units for communication with various other apparatuses on a transmission medium. For different user equipment, the user interface 704 may alternatively be an interface for externally or internally connecting to required devices. The connected devices include but are not limited to a keypad, a display, a speaker, a microphone, a joystick, and the like.

The processor 701 is responsible for managing the bus architecture and common processing. The memory 703 may store data used when the processor 701 performs an operation.

The network side device 700 can implement the processes implemented by the network side device in the method embodiment of FIG. 3. To avoid repetition, details are not described herein again.

An embodiment of the present disclosure further provides a computer-readable storage medium. The computer-readable storage medium stores a computer program. When the computer program is executed by a processor, the processes of the method embodiment of FIG. 3 are implemented, and a same technical effect can be achieved. To avoid repetition, details are not described herein again. The computer-readable storage medium is, for example, a read-only memory (Read-Only Memory, ROM), a random access memory (Random Access Memory, RAM), a magnetic disk, or an optical disc.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. Without being subject to further limitations, an element defined by a phrase "including a . . . " does not exclude presence of other identical elements in the process, method, article, or apparatus that includes the very element.

Based on the descriptions of the foregoing implementations, a person skilled in the art may clearly understand that the methods in the foregoing embodiments may be implemented by software with a necessary general hardware platform. Certainly, the methods in the foregoing embodiments may also be implemented by hardware. However, in many cases, the former is a preferred implementation. Based on such an understanding, the technical solutions of the present disclosure essentially or the part contributing to related technologies may be embodied in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skill in the art may make many forms without departing from the purpose of the present disclosure and the protection scope of the claims, all of which fall within the protection of the present disclosure.

The invention claimed is:

1. A beam failure recovery method, applied to a terminal device, and comprising:
   receiving higher layer signaling, wherein the higher layer signaling comprises configuration information of a control resource set for beam failure recovery CORESET-BFR configured for the terminal device, wherein the configuration information of the CORESET-BFR comprises:
   a cell index of a cell on which the CORESET-BFR is located;
   wherein the method further comprises:
   sending a beam failure recovery request BFRQ in a case that the terminal device determines that a beam failure event occurs in a first cell;
   switching to a second cell corresponding to the cell index, wherein the first cell and the second cell are different cells;
   determining quasi-colocation QCL information of the CORESET-BFR; and
   receiving beam failure recovery request response information based on the QCL information of the CORESET-BFR on the second cell.

2. The method according to claim 1, wherein the sending a BFRQ when the terminal device determines that a beam failure event occurs in a first cell comprises:
   determining a target beam reference signal for beam failure recovery; and
   sending the BFRQ by using a preconfigured target channel resource, wherein the BFRQ comprises identification information of the target beam reference signal.

3. The method according to claim 2, wherein the target channel resource is a semi-persistent physical uplink shared channel PUSCH.

4. The method according to claim 1, wherein the configuration information of the CORESET-BFR further comprises a transmission configuration indication state TCI state of the CORESET-BFR.

5. The method according to claim 4, wherein the determining QCL information of the CORESET-BFR comprises:
   determining the QCL information of the CORESET-BFR based on the TCI state of the CORESET-BFR.

6. A terminal device, comprising: a memory, a processor, and a computer program that is stored in the memory and that can run on the processor, wherein when the computer program is executed by the processor, the processor is configured to perform steps of:

receiving higher layer signaling, wherein the higher layer signaling comprises configuration information of a control resource set for beam failure recovery CORESET-BFR configured for the terminal device, wherein the configuration information of the CORESET-BFR comprises:

a cell index of a cell on which the CORESET-BFR is located;

wherein the processor is configured to, send a beam failure recovery request BFRQ in a case that the terminal device determines that a beam failure event occurs in a first cell;

switch to a second cell corresponding to the cell index, wherein the first cell and the second cell are different cells;

determine quasi-colocation QCL information of the CORESET-BFR; and receive beam failure recovery request response information based on the QCL information of the CORESET-BFR on the second cell.

7. The terminal device according to claim 6, wherein when the processor is configured to send a BFRQ when the terminal device determines that a beam failure event occurs in a first cell, the processor is configured to, determine a target beam reference signal for beam failure recovery; and send the BFRQ by using a preconfigured target channel resource, wherein the BFRQ comprises identification information of the target beam reference signal.

8. The terminal device according to claim 7, wherein the target channel resource is a semi-persistent physical uplink shared channel PUSCH.

9. The terminal device according to claim 6, wherein the configuration information of the CORESET-BFR further comprises a transmission configuration indication state TCI state of the CORESET-BFR.

10. The terminal device according to claim 9, wherein when the processor is configured to determine QCL information of the CORESET-BFR, the processor is configured to:

determine the QCL information of the CORESET-BFR based on the TCI state of the CORESET-BFR.

11. The terminal device according to claim 7, wherein when the processor is configured to determine QCL information of the CORESET-BFR, the processor is configured to determine QCL information of the target beam reference signal as the QCL information of the CORESET-BFR.

12. The terminal device according to claim 6, wherein when the processor is configured to receive beam failure recovery request response information based on the QCL information of the CORESET-BFR on the second cell, the processor is configured to, receive, within a target time window based on the QCL information of the CORESET-BFR on the second cell, the beam failure recovery request response information carried on a dedicated physical downlink control channel PDCCH in the CORESET-BFR.

13. The terminal device according to claim 12, wherein the processor is configured to, outside the target time window, switch to the first cell in which the beam failure event occurs; and monitor a CORESET configured on the first cell.

14. A non-transitory computer-readable storage medium, storing a computer program, wherein the computer program is executed by a processor to perform steps of:

receiving higher layer signaling, wherein the higher layer signaling comprises configuration information of a control resource set for beam failure recovery CORESET-BFR configured for the terminal device, wherein the configuration information of the CORESET-BFR comprises:

a cell index of a cell on which the CORESET-BFR is located;

wherein the computer program is executed by the processor to further perform:

sending a beam failure recovery request BFRQ in a case that the terminal device determines that a beam failure event occurs in a first cell;

switching to a second cell corresponding to the cell index, wherein the first cell and the second cell are different cells;

determining quasi-colocation QCL information of the CORESET-BFR; and receiving beam failure recovery request response information based on the QCL information of the CORESET-BFR on the second cell.

15. The non-transitory computer-readable storage medium according to claim 14, wherein when the computer program is executed by the processor to send a BFRQ when the terminal device determines that a beam failure event occurs in a first cell, the computer program is executed by the processor to further perform:

determining a target beam reference signal for beam failure recovery; and sending the BFRQ by using a preconfigured target channel resource, wherein the BFRQ comprises identification information of the target beam reference signal.

16. The non-transitory computer-readable storage medium according to claim 14, wherein the configuration information of the CORESET-BFR further comprises a transmission configuration indication state TCI state of the CORESET-BFR.

17. The non-transitory computer-readable storage medium according to claim 16, wherein when determining QCL information of the CORESET-BFR, the computer program is executed by the processor to further perform:

determining the QCL information of the CORESET-BFR based on the TCI state of the CORESET-BFR.

\* \* \* \* \*